United States Patent
Chen et al.

(10) Patent No.: US 12,257,888 B2
(45) Date of Patent: Mar. 25, 2025

(54) SOLAR PICKUP TRUCK BED COVER WITH LOCK BOLT STRUCTURE

(71) Applicant: Ningbo Crosstrip Electronic Science Co., Ltd, Cixi (CN)

(72) Inventors: Lei Chen, Cixi (CN); Lei Qiu, Cixi (CN)

(*) Notice: Subject to any disclaimer, the term of this patent is extended or adjusted under 35 U.S.C. 154(b) by 335 days.

(21) Appl. No.: 17/864,910

(22) Filed: Jul. 14, 2022

(65) Prior Publication Data
US 2023/0398843 A1    Dec. 14, 2023

(30) Foreign Application Priority Data
Jun. 9, 2022 (CN) .......................... 202210646514.9

(51) Int. Cl.
| | |
|---|---|
| *B60J 7/04* | (2006.01) |
| *B62D 33/04* | (2006.01) |
| *E05C 1/12* | (2006.01) |
| *F16B 5/02* | (2006.01) |
| *H02S 10/40* | (2014.01) |
| *H02S 30/10* | (2014.01) |

(52) U.S. Cl.
CPC .............. *B60J 7/041* (2013.01); *B62D 33/04* (2013.01); *E05C 1/12* (2013.01); *F16B 5/02* (2013.01); *H02S 10/40* (2014.12); *H02S 30/10* (2014.12)

(58) Field of Classification Search
CPC ........... B60J 7/041; B60J 7/141; B62D 33/04; B62D 33/0222; B62D 33/0273
See application file for complete search history.

(56) References Cited

U.S. PATENT DOCUMENTS 11,235,650 B2 * 2/2022 Gu ............................ B60P 7/02

* cited by examiner

*Primary Examiner* — Jason L Vaughan
*Assistant Examiner* — Amanda Kreiling

(57) ABSTRACT

The invention discloses a solar pickup truck bed cover with a lock bolt structure, wherein include a supporting system, a lock bolt clamp system, a lock bolt system, a solar panel, a power storage system and a fixing clamp assembly; the lock bolt clamp system is connected to the edge of the cargo hopper, the solar panel is connected with the supporting system; the power storage system includes a power storage box, the power storage box is connected to the supporting system through an anti-moving clamp system, the supporting system is connected to the lock bolt clamp system through a lock bolt system. The invention can convert light energy into electric energy and store it in the power storage box during driving by setting the solar panel, providing mobile power for the users in real time during outdoor activities. In addition, it can also provide emergency power when the new energy automobile is exhausted, allowing the car to travel about 30 kilometers in an emergency.

9 Claims, 14 Drawing Sheets

SOLAR PICKUP TRUCK BED COVER WITH LOCK BOLT STRUCTURE

CROSS REFERENCE TO RELATED APPLICATION

This application claims priority benefit of Chinese Invention Application No. 202210646514.9, filed on Jun. 9, 2022, and the entire contents of which are incorporated herein by reference.

TECHNICAL FIELD

This invention is relevant to automobile accessories field, especially about a solar pickup truck bed cover with lock bolt structure.

BACKGROUND TECHNOLOGY

The cargo hopper of the pickup truck (also known as sedan truck) often used to carry goods, since the cargo hopper is open, people invented the bed cover to avoid wetting the goods in the cargo hopper in rainy and snowy weather. Install the bed cover on the cargo hopper of the pickup truck, using the cover to prevent the goods in the cargo hopper from getting wet by rain.

The current pickup truck bed cover structure is described below, however customers hope current cover has updated additional functions on the basis of sheltering from the wind and rain. Since new energy vehicles have been generally accepted by consumers, a bed cover with power storage function is sure to be accepted. This bed cover can not only increase the driving range of electric vehicles, but also store electricity for customers to use outdoors, such as provide power for electric kettles, cookers, Etc. It not only increases the customer's sense of outdoor experience, but also increases the fun of outdoor play.

About the Invention

The purpose of the invention is to provide a solar pickup truck bed cover with lock bolt structure, by improving the structure, the light energy is converted into electrical energy for use by the customer, and also makes the opening and closing of the bed, cover more convenient.

To solve the existing technical problem above, thus the invention use the following method:

A solar pickup truck bed cover with lock bolt structure includes, a supporting system, a lock bolt clamp system, a lock bolt system, a solar panel, a power storage system and a fixing clamp assembly.

The lock bolt clamp system is connected to the edge of the cargo hopper. The solar panel is connected with the supporting system, the power storage system includes a power storage box, the power storage box is connected to the support system through an anti-moving clamp system.

The supporting system is connected to the lock bolt clamp system through a lock bolt system.

By setting solar panels, the light energy can be converted into electrical energy during the driving and stored in the power storage box, providing real-time mobile power for drivers during outdoor activities. It can also provide emergency power when the new energy automobile is exhausted, allowing the car to travel about 30 kilometers in an emergency.

By setting the lock system, the connection between the solar panels and the cargo hopper is more stable, and the solar panels are more convenient to open and close.

Further, the solar panel includes a large panel, a medium panel and a small panel, wherein the supporting system includes a large panel frame, a medium panel frame and a small panel frame; the large panel is connected with the large panel frame, the medium panel is connected with the medium panel frame, the small panel is connected with the small panel frame; the large panel frame is connected to the cargo hopper through the fixing clamp assembly; the medium panel frame and the small panel frame are respectively connected to the lock bolt clamp system through the lock bolt system; the solar panels are connected by means of large panel frame, medium panel frame and small panel frame, so that the bed cover can only be partially opened according to the needs when using.

Further, the lock bolt system includes a lock bolt system bar connected to the small panel frame, both ends of the lock bolt system bar are respectively connected with a special-shaped screw, the lock bolt system bar is connected with a steel wire adjuster in the middle, the lock bolt base is slidingly connected with a lock bolt, the lock bolt is sleeved on the special-shaped screw, a spring are arranged between the lock bolt and the special-shaped screw, the two lock bolts pass through the wire rope and the steel wire adjuster respectively, the two wire ropes pass through a handle respectively. By setting the lock bolt system, the small panel frame is connected to the cargo hopper by using the lock bolt system, when it needs to open, only needs to be pull the handle, which is easy to operate. Further, one end of the lock bolt is provided with an snap end for clamping with the cargo hopper, the other end of the lock bolt is connected with a steel wire; the steel wire is connected to the handle by a leather pull ring, the steel wire passes through the leather pull ring, when the handle is pulled, the steel wire is driven to move by the leather pull ring, so that the snap end contracts and thereby opening the cover.

Further, the special-shaped screw includes a fixing end and a connecting end, the lock bolt includes a snap end and a sliding end, the fixing end is fixed to the lock bolt base, the connecting end is socketed at the snap end, the connecting end is sleeved with a spring, both ends of the spring are respectively against the fixing end and the slider, the steel wire is connected to the sliding end, the special-shaped screw is connected to the lock bolt base to ensure relative fixation, then the lock bolt sliding to connect with the special-shaped screw to realize relative movement, finally through the spring and the steel wire to achieve the movement of the lock bolt; the side of the snap end away from the sliding end is beveled, the snap end is designed as a bevel, so the bed cover can be closed by only pressing the supporting system when closing; the small panel frame includes a small rectangular frame composed of a small panel middle bar, a tail rail and two small panel side rails, the small panel frame is connected to the lock bolt clamp system.

Further, the lock bolt clamp system includes an upper clamp, a plurality of fixing clamps and a plurality of lower clamps; each upper clamp is connected to a plurality of fixing clamps and a plurality of lower clamps, the fixing clamp and the lower clamp are combined to clamp the upper clamp with the cargo hopper, the upper clamp is a "I" shape structure, the upper clamp is designed as a "T"-shaped structure, which can not only ensure the clamping of the lower clamp and the fixing clamp, but also facilitate the snapping of the lock bolt; the lower clamp is connected to the fixing clamp through a screw, the bottom of the lower clamp, is connected with a plum screw, the plum screw jacks up the fixing clamp; by setting the lock bolt clamp system, it is convenient, to connect the lock bolt system with the cargo hopper; when using, first connect the lock bolt clamp system to the edge of the cargo hopper, through the upper clamp of the lock bolt clamp system to provide a clamping position for the lock bolt system, which is convenient for the installation of the lock bolt system, then connect the lock bolt system to the supporting system, and install solar panel on the supporting system, finally, through the connection between the lock bolt system and the lock bolt clamp system to achieve the installation of the bed cover; the lower clamp is "L" shaped, the lower clamp is connected with a bolt, for supporting the fixing clamp, the lower clamp is provided with a lower clamp barrier block for limiting the upper clamp, the lower clamp barrier block is arranged on the side of the upper clamp away from the fixing clamp opening, the fixed clamp opening is wave-shaped.

Further, the power storage system includes a power storage system cable and a photovoltaic junction box, the power storage box is provided with a power storage box socket and a power storage box locating hole, the photovoltaic junction box is inserted into the power storage system box socket through the power storage system cable, the storage box locating hole is arranged at the top of the storage box.

Further, the solar bed cover includes an anti-moving clamp system, the anti-moving clamp system includes a locating upper clamp and a locating lower clamp, the locating upper clamp includes a connecting arm and a fixing block, the fixing block is connected to the upper clamp flat block by the connecting arm, the locating upper clamp extends the connecting arm and the fixing block into the power storage box to fix the storage box and prevent it from sliding.

Further, it also includes an MPPT system, the MPPT system is connected to the anti-moving clamp system, the MITT system is connected to the solar panel and the power storage system respectively.

The advantages of the invention is that by setting the solar panel, light energy can be converted into electric energy and stored in the power storage box during driving, so as to provide mobile power for the users in real time during outdoor activities. It can also provide emergency power when the new energy automobile is exhausted, allowing the car to travel about 30 kilometers in an emergency.

1—Large panel; 2—Medium panel; 3—Small panel, 301—Photovoltaic junction box; 302—Tail rail; 303—Small panel right connector; 304—Small panel side rail; 305—Small panel right reinforcing bar; 306—Small panel middle bar right connector; 307—Small panel middle bar; 308—Small panel middle bar left connector; 310—Small panel left connector; 311—Small panel left reinforcing bar; 4—Fixing clamp; 4012—Fixing clamp groove, 403—Waterproof adhesive tape; 404—locating upper clamp; 4041—Front rail fixing hole; 4042—Adhesive side; 405—locating lower clamp; 4051—Lower clamp barrier block; 406—Plum screw; 5—Anti-moving system; 5011—Fixing block; 5012—Connecting arm; 5013—Upper clamp flat block; 6—Lock bolt clam system; 601—Upper clamp; 603—Lower clamp; 604—Fixed clamp; 605—Plum screw; 7—Power storage system; 8—Lock bolt system; 801—Position block; 802—Lock bolt system bar; 803—Leather pull ring; 8—4-steel wire; 805—Handle; 806—Specialised-screw; 8061—fixed end; 8062—Connection end; 8065—Spring; 807—Lock bolt base; 8072—locating hole; 8076—Latch; 808 Lock bolt; 8081—Snap end; 8082—Sliding end; 809—Steel wire adjuster base; 810—Steel wire adjuster; 9—Small shaft; 10—Large shaft; 11—MPPT system.

The Concrete Method to Carry out

The following instruction further explains the invention's concrete implementation method.

In order to enable a clearer understanding of the above-mentioned objects, features and advantages of the present invention, the present invention will be described in detail below in connection with the accompanying drawings and specific embodiments. It should be noted that the embodiments of the present application, and the features in the embodiments can be combined with each other without conflict.

The terms "first," "second," "third," etc. are only used to differentiate the description and should not be understood as indicating or implying relative importance.

In the description, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, the meanings of the above terms in the present invention can be understood in specific situations.

The specific embodiments of the present invention will be described in detail below in connection with the accompanying drawings. It should be understood that the specific embodiments described herein are intended only to illustrate and explain the present invention and are not intended to limit it.

EMBODIMENT 1

Figure 1:
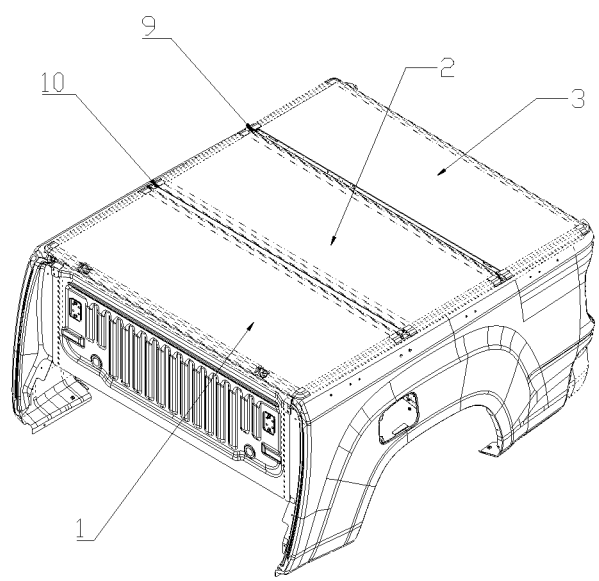
FIG. 1 is a installation drawing of the solar bed cover in the invention.
Figure 2:
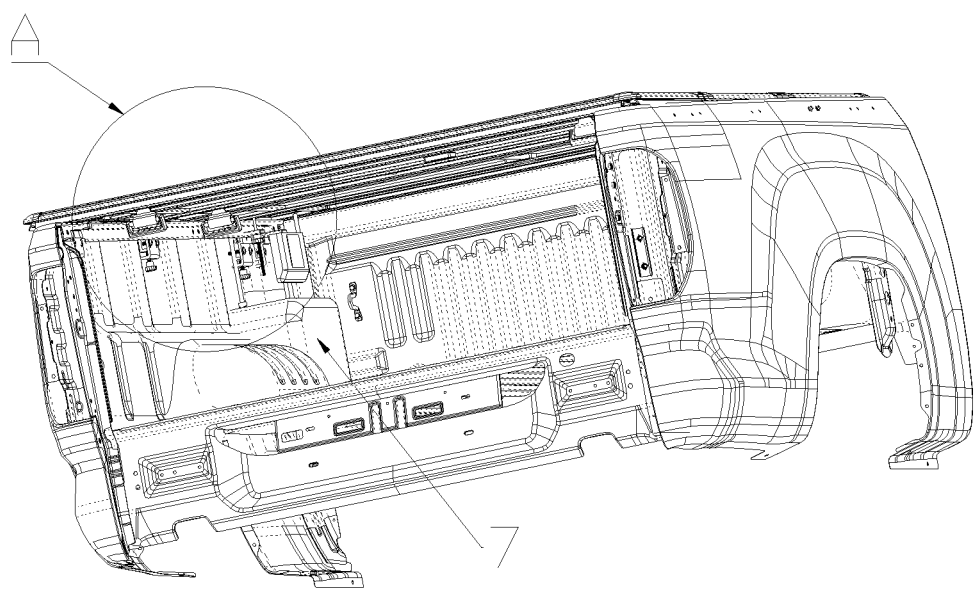
FIG. 2 is the structural illustration of the lock bolt clamp system in the invention.
Figure 3:
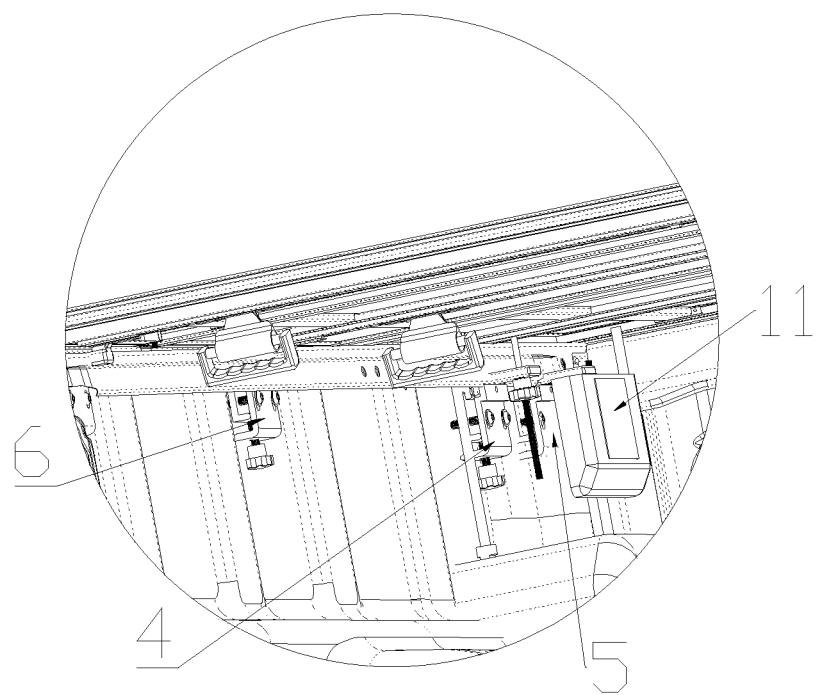
FIG. 3 is a partial enlarged view of part A in FIG. 2.
Figure 4:
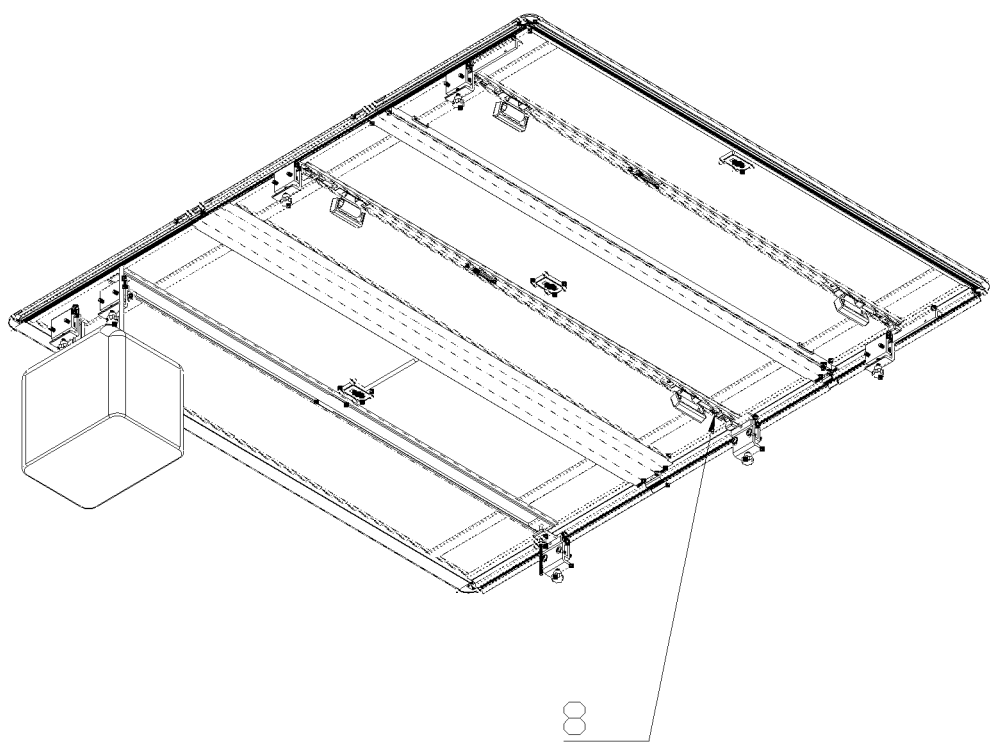
FIG. 4 is the structural illustration of the lock bolt, system in, the invention.

As shown in FIGS. 1-4, a solar pickup truck bed cover with lock bolt structure includes a supporting system, a lock bolt clamp system (6), a lock bolt system (8), a solar panel, a power storage system (7) and a fixing clamp assembly (4);

the lock bolt clamp system (6) is connected to the edge of the cargo hopper;

the solar panel is connected with the supporting system, the power storage system (7) includes a power storage box, the power storage box is connected to the support system through an anti moving clamp system (5), the supporting system is connected to the lock bolt clamp system (6) through a lock bolt system (8).

By setting solar panels, the light energy can be converted into electrical energy during the driving and stored in the power storage box, providing real-time mobile power for drivers during outdoor activities. It can also provide emergency power when the new energy automobile is exhausted, allowing the car to travel about 30 kilometers in an emergency.

EMBODIMENT 2

Figure 5:
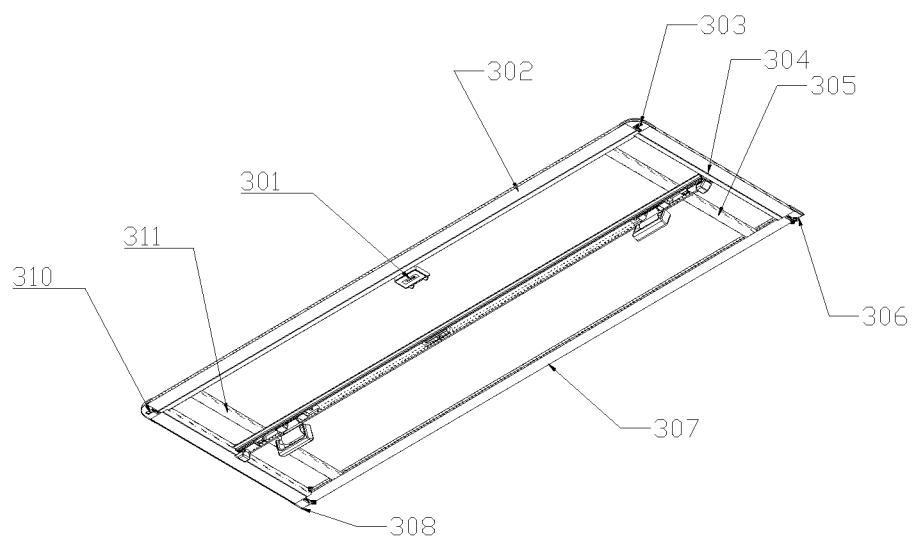
FIG. 5 is the structural illustration of the medium solar panel in the invention.
Figure 6:
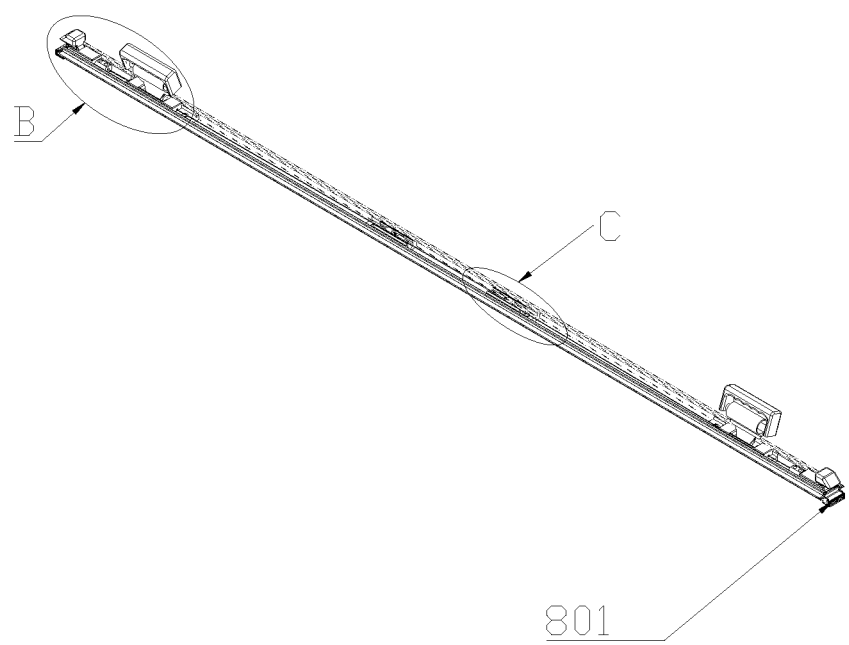
FIG. 6 is the structural illustration of the lock bolt system in the invention.
Figure 7:
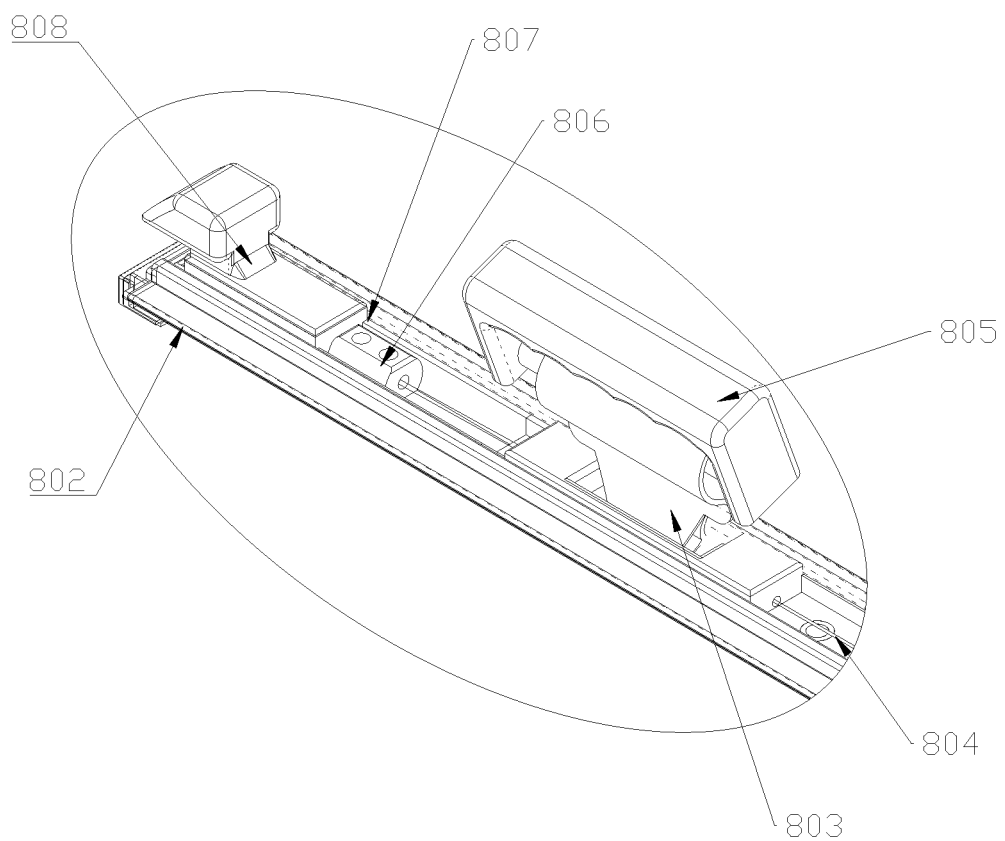
FIG. 7 is a partial enlarged view of part B in FIG. 6.
Figure 8:
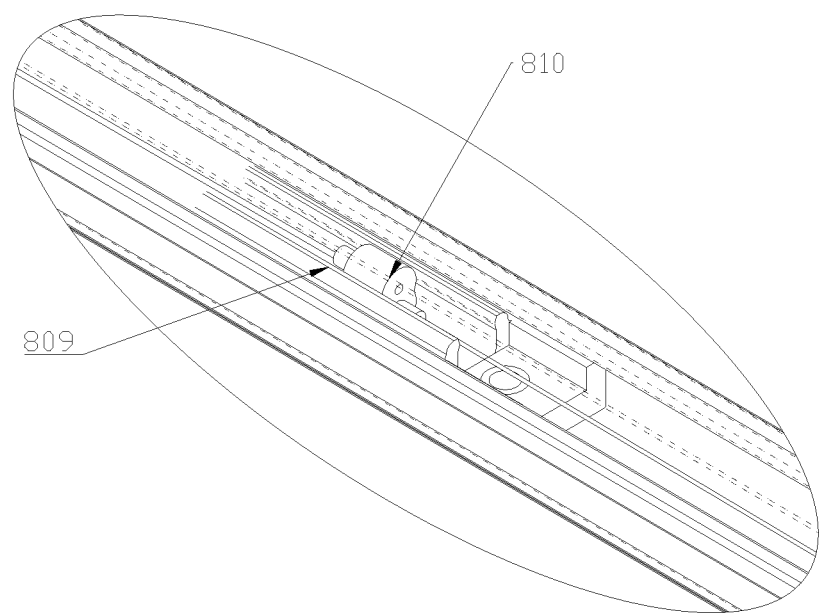
FIG. 8 is a partial enlarged view of part C in FIG. 7.
Figure 9:
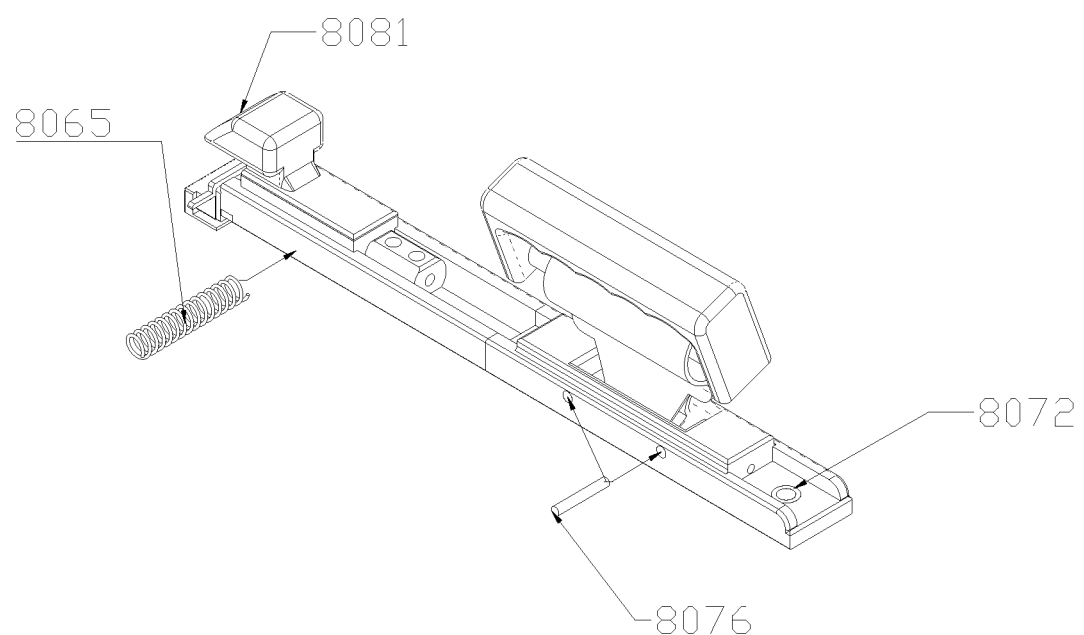
FIG. 9 is the structural illustration of the solar lock bolt in the invention.
Figure 10:
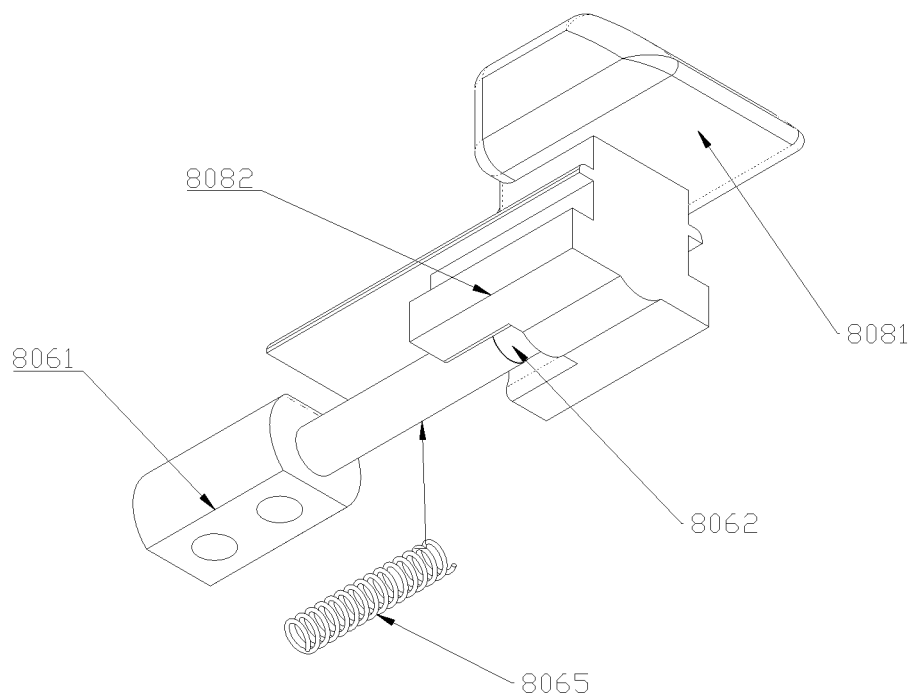
FIG. 10 is the structural illustration of the lock bolt in the invention.
Figure 11:
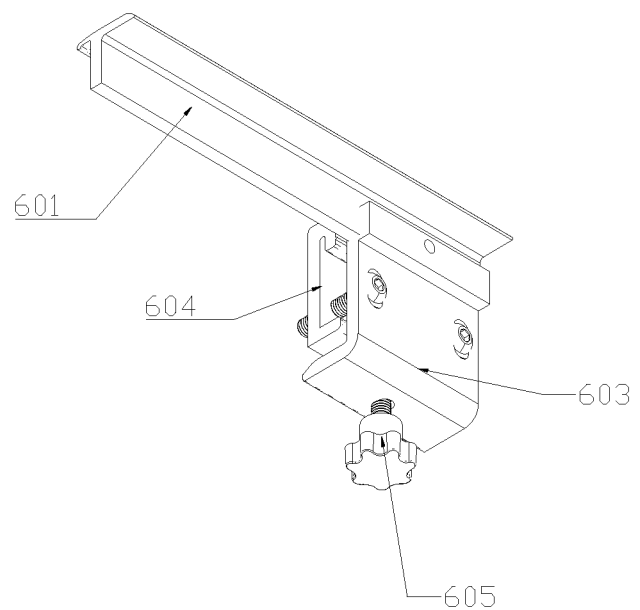
FIG. 11 is the structural illustration of the lock bolt clamp in the invention.
Figure 12:
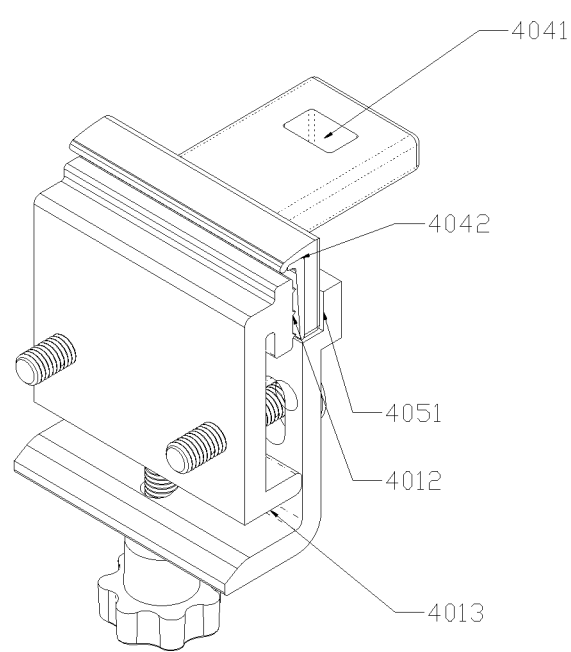
FIG. 12 is a structural schematic diagram 1 of the fixing clamp system.
Figure 13:
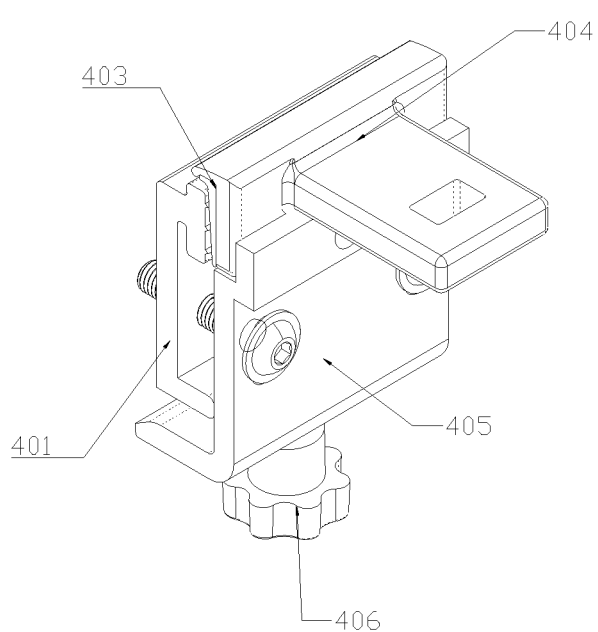
FIG. 13 is the structural schematic diagram 2 of the fixing clamp system.
Figure 14:
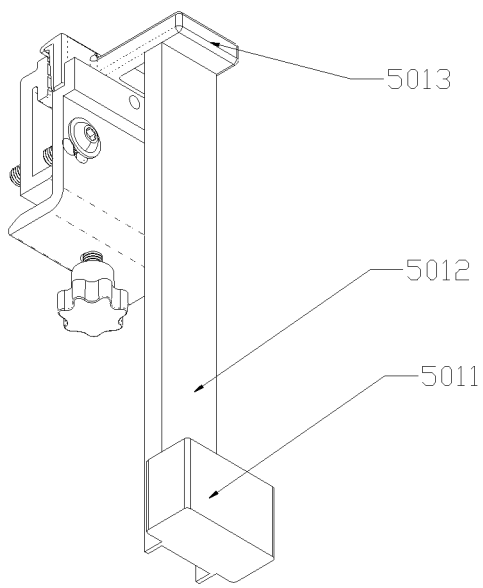
FIG. 14 is a schematic diagram of the structure of the anti moving clamp system.

As shown in FIGS. 1-11, a solar pickup truck bed cover with lock bolt structure includes a supporting system, a lock bolt clamp system (6), a lock bolt system (8), a solar panel, a power storage system (7) and a fixing clamp assembly (4), the lock bolt clamp system (6) is connected to the edge of the cargo hopper;

the solar panel is connected with the supporting system, the power storage system (7) includes a power storage box, the power storage box is connected to the support system through an anti-moving clamp system (5), the supporting system is connected to the lock bolt clamp system (6) through a lock bolt system (8).

By setting solar panels, the light energy can be converted into electrical energy during the driving and stored in the power storage box, providing real-time mobile power for drivers during outdoor activities. It can also provide emergency power when the new energy automobile is exhausted, allowing the car to travel about 30 kilometers in an emergency.

By setting the lock bolt system (8), the connection between the solar panels and the cargo hopper is more stable, and the solar panels are more convenient to open and close.

Wherein the solar panel includes a large panel (1), a medium panel (2) and a small panel (3), the supporting system includes a large panel frame, a medium panel frame and a small panel frame, the large panel (1) is connected with the large panel frame, the medium panel (2) is connected with the medium panel frame, the small panel (3) is connected with the small panel frame.

The large panel frame is connected to the cargo hopper through the fixing clamp assembly (4).

The medium panel frame and the small panel frame are respectively connected to the lock bolt clamp system (6) through the lock bolt system (8); The solar panels are connected by means of large panel frame, medium panel frame and small panel frame, so that the bed cover can only be partially opened according to the needs when used.

The lock bolt system (8) includes a lock bolt system bar (802) connected to the small panel frame, both ends of the lock bolt system bar (802) are respectively connected with a special-shaped screw (806), the lock bolt system bar (802) is connected with a steel wire adjuster (810) in the middle, the lock bolt base (807) is slidingly connected with a lock bolt (808), the lock bolt (808) is sleeved on the special-shaped screw (806), the lock bolt (808) and the special-shaped screw (806) are connected with a spring (8065), the two lock bolts (808) pass through the wire rope (804) and the steel wire adjuster (810) respectively, the two wire ropes (804) pass through a handle (805) respectively. By setting the lock bolt system (8), the small panel frame is connected to the cargo hopper by using the lock bolt system (8), and when it needs to open, only needs to be pull the handle (805), which is easy to operate.

One end of the lock bolt (808) is provided with an snap end (8081) for clamping with the cargo hopper, the other end of the lock bolt (808) is connected with a steel wire (804);

The steel wire (804) is connected to the handle (805) by a leather pull ring (803), the steel wire (804) passes through the leather pull ring (803).

The special-shaped screw (806) includes a fixing end (8061) and a connecting end (8062), the lock bolt (808) includes a snap end (8081) and a sliding end (8082), the fixing end (8061) is fixed to the bolt base (807), the connecting end (8062) is socketed to the snap end (8081), the connecting end (8062) is sleeved with a spring (8065), both ends of the spring (8065) are respectively against the fixing end (8061) and the slider (8082).

The steel wire (804) is connected to the sliding end (8082).

The special-shaped screw (806) is connected to the lock bolt base (807) to ensure relative fixation, then the lock bolt (808) sliding to connect with the special-shaped screw (806) to realize relative movement, finally through the spring (8065) and the steel wire (804) to achieve the movement of the lock bolt (808).

The side of the snap end (8081) away from the sliding end (8082) is beveled. The snap end (8081) is designed as a bevel, so the bed cover can be closed by only pressing the supporting system when closing.

The small panel frame includes a small rectangular frame composed of a small panel middle bar (307), a tail rail (302) and two small panel side rails (304), the small panel frame is connected to the lock bolt clamp system (6).

The lock bolt clamp system (6) includes an upper clamp (601), plurality of fixing clamps (401) and a plurality of lower clamps (603).

Each upper clamp (601) is connected to a plurality of fixing clamps (401) and a plurality of lower clamps (603), the fixing clamp (401) and the lower clamp (603) in conjunction to clamp the upper clamp (601) with the cargo hopper.

The upper clamp (601) is a "T" shape structure.

The upper clamp (601) is designed as a "T"-shaped structure, which can not only ensure the clamping of the lower clamp (603) and the fixing clamp (401), but also facilitate the snapping of the lock bolt (808).

The lower clamp (603) is connected to the fixing clamp (401) through a screw.

The bottom of the lower clamp (603) is connected with a plum screw (406), the plum screw (406) jacks up the fixed clamp.

By setting the lock bolt clamp system (6), it is convenient to connect the lock bolt system (8) with the cargo hopper.

When using, first connect the bolt clamp system (6) to the edge of the cargo hopper, through the upper clamp (601) of the lock bolt clamp system (6) to provide a clamping position for the lock bolt system (8), which is convenient for the installation of the lock bolt system.

Then connect the lock bolt system (8) to the supporting system, and install solar panel on the supporting system, finally, through the connection between the lock bolt system (8) and the lock bolt clamp system (6) to achieve the installation of the bed cover.

The lower clamp (603) is "L" shaped, the lower clamp (603) is connected with a bolt for supporting the fixing clamp (401), the lower clamp (603) is provided with a lower clamp barrier block (4051) for limiting the upper clamp (404), the lower clamp barrier block (4051) is arranged on the side of the upper clamp (601) away from the fixed clamp opening (4012).

The fixed clamp opening (4012) is wave-shaped.

The power storage system (7) includes a power storage system cable (7) and a photovoltaic junction box (301), the power storage box is provided with a power storage box socket and a power storage box locating hole (8072), the photovoltaic junction box (301) is inserted into the power storage system box socket through the power storage system cable, the storage box locating hole (8072) is arranged at the top of the storage box.

Further, the solar bed cover includes an anti-moving clamp system (5), the anti-moving clamp system (5) includes a locating upper clamp (404) and a locating lower clamp (405), the locating upper clamp (404) includes a connecting arm (5012) and a fixing block (5011), the fixing block (5011) is connected to the upper clamp flat block (5013) by the connecting arm (5012), the locating upper clamp (404) extends the connecting arm (5012) and the fixing block (5012) into the power storage box to fix the storage box and prevent it from sliding.

Further, it also includes an MPPT system (11), the MDPT system (11) is connected to the anti-moving clamp system (5), the MPPT system (11) is connected to the solar panel and the power storage system (7) respectively.

The present invention is not limited to the above-mentioned optional embodiments, anyone can draw other various forms of pbaructs under the inspiration of the present invention. However, no matter what changes are made in its shape or structure, all technical solutions that fall within the scope defined by the claims of the present invention should fall within the protection scope of the present invention.

The invention claimed is:

1. A solar pickup truck bed cover with lock bolt structure including a supporting system, a lock bolt clamp system (6), a lock bolt system (8), a solar panel, a power storage system (7) and a fixing clamp assembly (4), wherein
the lock bolt clamp system (6) is connected to an edge of a cargo hopper;
the solar panel is connected with the supporting system, the supporting system is connected to the lock bolt clamp system (6) through the lock bolt system (8);
the power storage system (7) includes a power storage box, the power storage box is connected to the support system through an anti-moving clamp system (5);
the solar panel includes a large panel (1), a medium panel (2) and a small panel (3), wherein the supporting system includes a large panel frame, a medium panel frame and a small panel frame, the large panel (1) is connected with the large panel frame, the medium panel (2) is connected with the medium panel frame, and the small panel (3) is connected with the small panel frame;
the large panel frame is connected to the cargo hopper through the fixing clamp assembly (4); and
the medium panel frame and the small panel frame are respectively connected to the lock bolt clamp system (6) through the lock bolt system (8).

2. A solar pickup truck bed cover with lock bolt structure according to claim 1, wherein the lock bolt system (8) includes a lock bolt system bar (802) that connects to the small panel frame; both ends of the lock bolt system bar (802) are respectively connected with a special-shaped screw (806), the lock bolt system bar (802) is connected with a steel wire adjuster (810) in the middle, a lock bolt base (807) is slidingly connected with a lock bolt (808), the lock bolt (808) is sleeved on the special-shaped screw (806), and a spring (8065) is arranged between the lock bolt (808) and the special-shaped screw (806); two lock bolts (808) at the both ends of the lock bolt system bar (802) are connected to the steel wire adjuster (810) through two wire ropes (804), respectively; and the two wire ropes (804) pass through respective handles (805).

3. A solar pickup truck bed cover with lock bolt structure according to claim 2, wherein one end of the lock bolt (808) is provided with a snap end (8081) for clamping the cargo hopper, the other end of the lock bolt (808) is connected with a respective one of the two wire ropes (804); and
the respective one of the two wire ropes (804) is connected to a respective one of the handles (805) by a leather pull ring (803), and the respective one of the two wire ropes (804) passes through the leather pull ring (803).

4. A solar pickup truck bed cover with lock bolt structure according to claim 2, wherein the special-shaped screw (806) includes a fixing end (8061) and a connecting end (8062), the lock bolt (808) includes a snap end (8081) and a sliding end (8082), the fixing end (8061) is fixed on the lock bolt base (807), the connecting end (8062) is socketed to the snap end (8081), the connecting end (8062) is sleeved with the spring (8065), two ends of the spring (8065) are respectively against the fixing end (8061) and the sliding end (8082).

5. A solar pickup truck bed cover with lock bolt structure according to claim 1, the small panel frame includes a small rectangular frame composed of a small panel middle bar (307), a tail rail (302) and two small panel side rails (304), and the small panel frame is connected with the lock bolt clamp system (6).

6. A solar pickup truck bed cover with lock bolt structure according to claim 1, wherein the lock bolt clamp system (6) includes an upper clamp (601), a plurality of fixing clamps (401) and a plurality of lower clamps (603); and
each upper clamp (601) is connected to a plurality of fixing clamps (401) and a plurality of lower clamps (603), and the fixing clamp (401) and the lower clamp (603) in conjunction to clamp the upper clamp (601) with the cargo hopper.

7. A solar pickup truck bed cover with lock bolt structure according to claim 6, wherein the upper clamp (601) is a "T" shape structure.

8. A solar pickup truck bed cover with lock bolt structure according to claim 6, wherein the bottom of the lower clamp (603) is connected with a plum screw (406), and the plum screw (406) jacks up the fixing clamp (401).

9. A solar pickup truck bed cover with lock bolt structure according to claim 6, wherein the lower clamp (603) is "L" shaped, the lower clamp (603) is connected with a bolt for supporting the fixing clamp (401), the lower clamp (603) is provided with a lower clamp barrier block (4051) for limiting the upper clamp (601), and the lower clamp barrier block (4051) is provided on the side of the upper clamp (601) away from a fixed clamp (4012).

* * * * *